(12) United States Patent
Furuyama et al.

(10) Patent No.: US 6,615,546 B2
(45) Date of Patent: Sep. 9, 2003

(54) AUTOMOTIVE DOOR CONSTRUCTION

(75) Inventors: Junichi Furuyama, Kanagawa (JP); Masayuki Saito, Kanagawa (JP)

(73) Assignee: Kasai Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 09/801,056

(22) Filed: Mar. 8, 2001

(65) Prior Publication Data

US 2001/0025456 A1 Oct. 4, 2001

(30) Foreign Application Priority Data

Mar. 31, 2000 (JP) ........................................ 2000-098336

(51) Int. Cl.$^7$ ................................................. B60J 5/04
(52) U.S. Cl. ........................ 49/502; 49/352; 296/146.7
(58) Field of Search .......................... 49/352, 375, 374, 49/502, 348, 349; 296/146.7

(56) References Cited

U.S. PATENT DOCUMENTS

| | | | | |
|---|---|---|---|---|
| 5,062,240 A | * | 11/1991 | Brusasco | 49/348 |
| 5,095,659 A | * | 3/1992 | Benoit et al. | 49/502 |
| 5,127,191 A | * | 7/1992 | Ohta | 49/62 |
| 5,904,002 A | * | 5/1999 | Emerling et al. | 49/502 |
| 5,927,020 A | * | 7/1999 | Kobrehel | 49/502 |
| 5,937,584 A | * | 8/1999 | Salmonowicz et al. | 49/502 |
| 5,946,858 A | * | 9/1999 | Staser | 49/352 |
| 6,139,088 A | * | 10/2000 | Okamoto et al. | 296/146.6 |
| 6,170,199 B1 | * | 1/2001 | Stenzel et al. | 49/502 |
| 6,185,872 B1 | * | 2/2001 | Seeberger et al. | 49/502 |
| 6,185,873 B1 | * | 2/2001 | Saito | 49/502 |
| 6,205,714 B1 | * | 3/2001 | Staser et al. | 49/502 |
| 6,233,875 B1 | * | 5/2001 | Carlo et al. | 49/502 |
| 6,367,202 B1 | * | 4/2002 | Reed et al. | 49/502 |

* cited by examiner

Primary Examiner—Jerry Redman
(74) Attorney, Agent, or Firm—Foley & Lardner

(57) ABSTRACT

A door trim 50 is made up of two divided trims of an upper trim 51 and a lower trim 52. A door elevating mechanism 27 composed of a guide rail 28, a motor 30, a step lamp 57, a speaker grille 56, are subassembled to the lower trim 52. In particular, the motor 30 is mounted on an extended attachment element 67 formed by extending the upper part of a pocket back cover 6 constituting a pocket 47 of the lower trim 52. The lower trim 52 configured in this manner is mounted to an inner panel 21. After a door glass 26 is installed to the door elevating mechanism 27, the upper trim 51 is mounted to the inner panel 21. Therefore, even if the area of an opening in the inner panel is not increased so much, the installation work of the door glass can be done easily, and a demand for increased size of the door glass can be met.

15 Claims, 8 Drawing Sheets

AUTOMOTIVE DOOR CONSTRUCTION

CROSS-REFERENCE TO RELATED APPLICATION

This application claims all benefits accruing 35 U.S.C 119 from the Japanese Patent Application No. 2000-98336, filed on Mar. 31, 2000.

BACKGROUND OF THE INVENTION

1. Field of the Invention

The present invention relates to an automotive door construction.

2. Description of the Related Art

Figure 7:
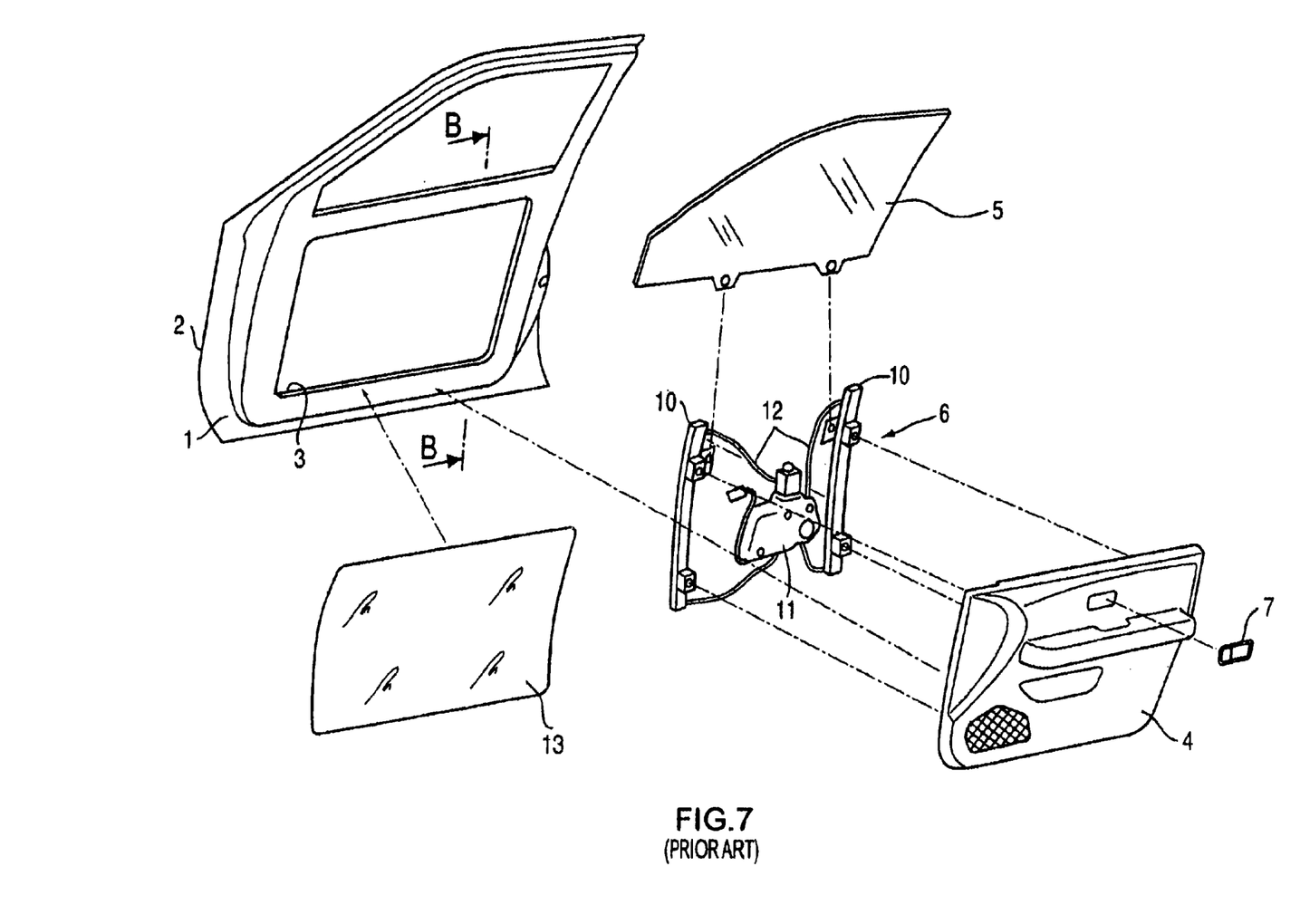
FIG. 7 is a perspective view of a conventional door construction.

Conventionally, a door construction of this type is configured, for example, as shown in FIG. 7, so that flanges formed at the outer peripheries of an inner panel 1 and an outer panel 2, are joined to each other, by which a door space 3 is formed between the panels 1 and 2.

The inner panel 1 is formed with a plurality of openings 4 which are used as installation work holes to arrange parts in the door space 3. The openings 4 are formed as small as possible in order to secure predetermined composition of the inner panel 1, and, in turn, the door construction itself.

Through this opening 4, a glass elevating mechanism 7 that is not fitted with a door glass 6 is slipped into the door space 3. After an attachment hole 8a provided in a guide rail 8 constituting the glass elevating mechanism 7 is caused to coincide with an attachment hole 1a provided in the inner panel 1, a screw 8c or the like is screwed in the attachment holes 8a and 1a, by which the glass elevating mechanism 7 is installed to the inner panel 1. In this case, the glass elevating mechanism 7 has a glass mount 8b disposed slidable in the guide rail 8 and a motor 10 for driving a wire 9 for sliding the glass mount 8b, so that the rotation of the motor 10 is transmitted to the wire 9, and thereby the glass mount 8b is slid along the guide rail 8, thereby the door glass 6 being moved up or down. Since the guide rail 8 and the motor 10 are connected to each other by the wire 9, the whole of the glass elevating mechanism 7 can be slipped into the door space 3 through one opening 4 by bending the wire 9.

Further, by screwing a screw or the like in an attachment hole 10a in the motor 10 and a motor attachment hole 2a formed in the inner panel 1, the motor 10 is mounted on the inner panel 1.

After the glass elevating mechanism 7 is installed to the inner panel 1, the lower end side of the glass 6 is inserted through an upper opening 5 of the door space 3 so that the glass 6 can move up and down in a sash 12 installed so as to extend into the interior of the door space 3. Holes y in a lower end mounting portion 6a of the glass 6 are caused to coincide with holes x in a glass mounting portions 8b slidably provided on the guide rails 8, and the glass 6 is fixed to the glass mounting portions 8b using screws or the like by inserting a screwdriver or the like through holes k.

Figure 8:
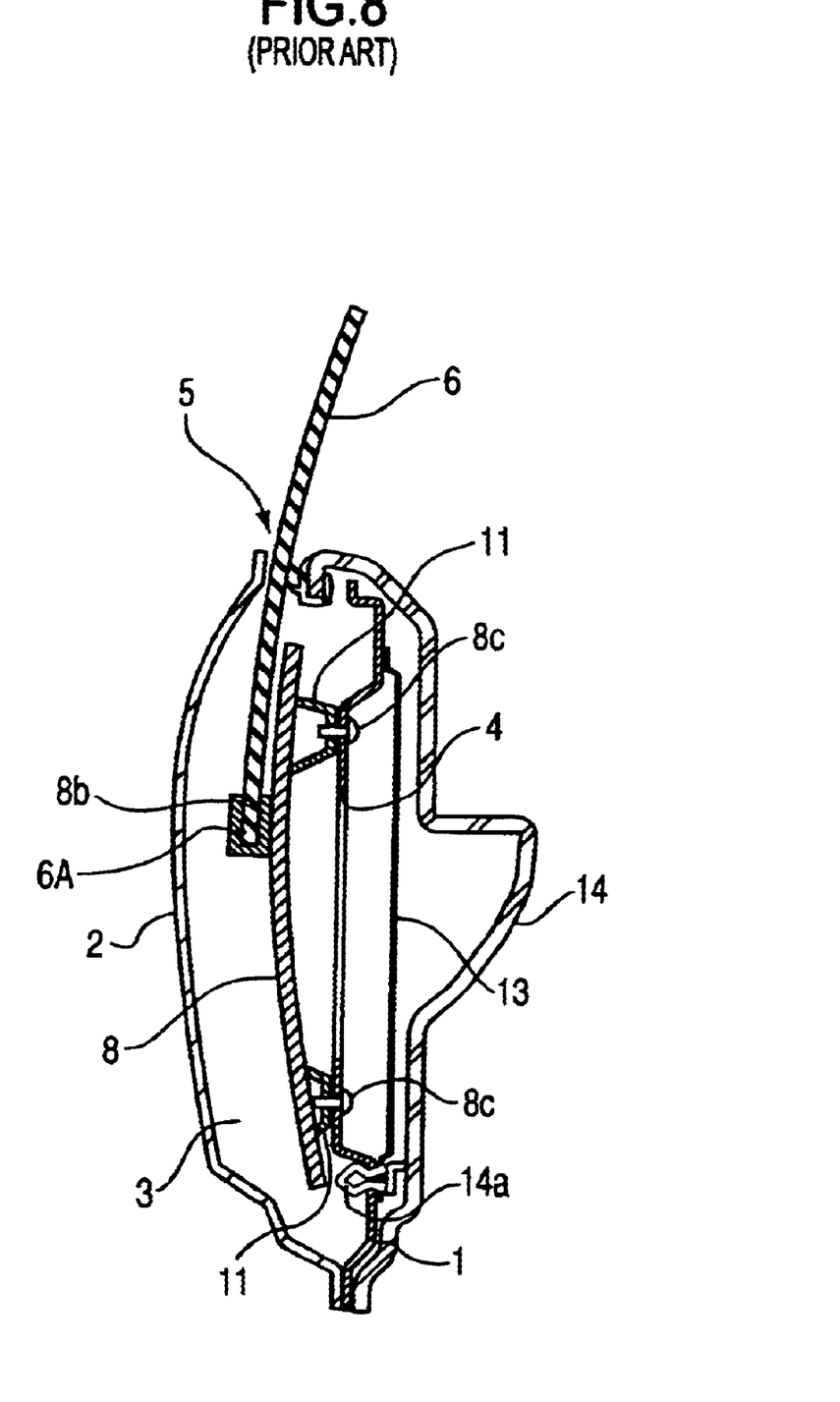
FIG. 8 is a sectional view taken along the line B—B of FIG. 7.

The guide rail 8 is installed to the inner panel 1 as shown in FIG. 8. Specifically, the upper and lower ends of the guide rail 8 are attached to the inner panel 1 via rail bracket 11 in such a manner as to float so that the door 6 can move up and down smoothly. Thereby, the glass mounting portion 8b can slide in the guide rail 8 so as to follow the elevating path of the curved glass 6.

After the glass elevating mechanism 7 and the like are mounted in the door space 3 as described above, a sealing screen 13 is affixed to substantially the whole area of the inner panel 1 to close the openings 4 by the sealing screen 13. After that, a door trim 14 is installed to the inner panel 1 by using trim clips 14a or partially using screws or the like.

However, in the conventional automotive door construction configured as described above, the plural openings 4 provided in the inner panel 1 cannot be formed as too large openings from the viewpoint of the rigidity of the door construction provided by the inner panel 1.

For this reason, the installation of the glass elevating mechanism 7 to the inside of the inner panel 1 requires work in which while the glass elevating mechanism 7 is held by one hand of the worker inserted into the opening 4, the attachment holes 1a and 8a are caused to coincide with each other and screws are put into the holes by the other hand, by which the glass elevating mechanism 7 is fixed to the inner panel 1 by using a power tool. In this installation work, not only the insertion of the screw into the attachment hole 8a requires blind work, but also the holding of the glass elevating mechanism 7 with a considerably heavy weight performed by one hand requires very difficult work. Also, since the guide rail 8 and the motor 10 are connected to each other by the wire 9, the handling of the glass elevating mechanism 7 in the door space 3 is very inconvenient. Thus, the installation work is done under a considerably bad condition.

Further, since the inner panel 1 is provided with only small openings 4 to prevent a decrease in rigidity thereof, which increases the weight significantly, causing hindrance to the decrease in weight of the automotive door construction.

Also, the installation of the glass 6 to the guide rails 8 requires work in which the worker inserts the glass 6 gripped by one hand through the upper opening 5 of the door space 3, holds the lower end of the glass 6 by the other hand, makes the holes x in the glass mounting portions 8b and the holes y in the lower end mounting portions 6a of the glass 6 coincide with each other, and fixes the glass 6 using screws or the like by inserting a screwdriver through the through holes k. This glass installation work is also blind work inevitably, so that the workability is low in this respect as well.

Further, in the conventional construction, the elevating unit, harness, trim, and the like are installed with the vehicle body panel being a base. Therefore, it is necessary to provide clearances in laying out these elements, so that the volume of a door pocket and a joint portion cannot be increased greatly, which places restrictions on the degree of freedom of design and the ease of use of the pocket and an armrest.

The present invention has been made in view of the above situation, and accordingly an object thereof is to provide an automotive door construction which significantly increases the workability of installing a glass elevating mechanism and the like and the degree of freedom of interior layout.

BRIEF SUMMARY OF THE INVENTION

To achieve the above object, the present invention provides an automotive door construction configured so that a door space is formed by joining outer edges of an outer panel and an inner panel, and the inner panel side of the door space is finely dressed up with a door trim, wherein the door trim is made up of two divided trims of an upper trim and a lower trim; at least a glass elevating mechanism is installed on the side of the lower trim in advance by subassembling; the upper and lower end portions of a guide rail constituting the glass elevating mechanism project from the upper and lower end side of the lower trim; the guide rail is connected to the inner panel in a state of being disposed in the door space so as to lie across an opening, which is formed in the central portion of the inner panel and is open to the door space, and the lower trim is mounted to the inner panel; and after a door glass moved up and down by the glass elevating mechanism is installed to the guide rail, the upper trim is mounted to the inner panel.

According to the present invention, the elevating unit, trim, harness, and the like are subassembled, and are mounted collectively to a vehicle body panel. For this purpose, a large opening is provided in the vehicle body panel, so that installation work done by inserting the glass elevating mechanism can be performed by utilizing this large opening, by which the installation workability can be improved greatly.

Also, according to the present invention, the door trim is made up of two divided trims of the upper trim and the lower trim, and after at least the glass elevating mechanism is subassembled to the lower trim, the subassembly is installed to the inner panel, and then the door glass is installed to the glass elevating mechanism, thereafter the upper trim being mounted to the inner panel. Therefore, the installation work of the door glass to the door elevating mechanism can be done by using the opening, which is open large because the installation work is done before the upper trim is mounted, so that the installation work of the door glass is easy to do, and moreover a larger-sized door glass can also be installed.

Also, in the present invention, the subassembly of the glass elevating mechanism to the lower trim is at least a subassembly in which the guide rail is assembled to a pocket back cover constituting a pocket of the lower trim.

Also, in the present invention, an extended attachment element is formed integrally at the upper part of the pocket back cover, and a motor constituting the glass elevating mechanism is mounted on the extended attachment element.

By this configuration, a load applied to the motor to activate the glass elevating mechanism is distributed in the plane direction of the extended attachment element, so that the vibrations of the motor are not transmitted to the door trim itself.

Also, in order to mount the motor directly to the door trim, a mounting boss must be erected on the door trim. In this embodiment, the motor is not mounted to the door trim, but is mounted on the extended attachment element formed by extending the pocket back cover. Therefore, a sink problem occurring in molding the door trim, caused by the formation of the mounting boss, can be solved.

Also, in the present invention, the extended attachment element is installed to the inner panel. Therefore, the extended attachment element is attached to the inner panel by using screws or the like. By this configuration, the rigidity of the door trim, especially the lower trim, can be increased, so that the behavior of the motor at the time when the door is closed can be retrained completely.

Also, in the present invention, the guide rail is fixed to the upper part of the lower trim. If the area of the opening in the inner panel is increased, there arise considerable restrictions on the installation of the door trim itself to the inner panel. However, in the present invention configured as described above, since the upper part of the lower trim is fixed to the guide rail whose upper and lower ends are attached to the inner panel, the lower trim is resultantly attached to the inner panel, so that the above-described restrictions are eliminated. Also, just at the upper part of the lower trim exists an armrest, and the armrest is fitted with a pull handle. A load applied when the pull handle is operated is transmitted to and supported by the guide rail, so that the displacement of the door trim can be decreased greatly.

Also, in the present invention, the guide rail and the lower trim are fixed to each other so as to be finely adjustable in the longitudinal and vertical directions of a vehicle body. By this configuration, the guide rail is installed with the inner panel being the reference. In this case, variations in installation of the guide rail to the lower trim can be absorbed by finely adjusting the guide rail and the lower trim in the longitudinal and vertical directions of the vehicle body.

DETAILED DESCRIPTION OF THE INVENTION

One embodiment of the present invention will now be described with reference to FIGS. 1 to 6.

Referring to these figures, a door body 20 is formed so that a door space 23 is formed by joining flanges formed at the outer peripheries of an inner panel 21 and an outer panel 22. The inner panel 21 is formed with one opening 24 that is open to the door space 23.

Also, the door body 20 has an upper opening 25 at the upper part thereof, which is open to the door space 23. Thereby, a door glass 26 moves up and down in a sash 32, which is installed so as to extend in the door space 23, so as to go into and out of the door space 23 through the upper opening 25.

Figure 3:
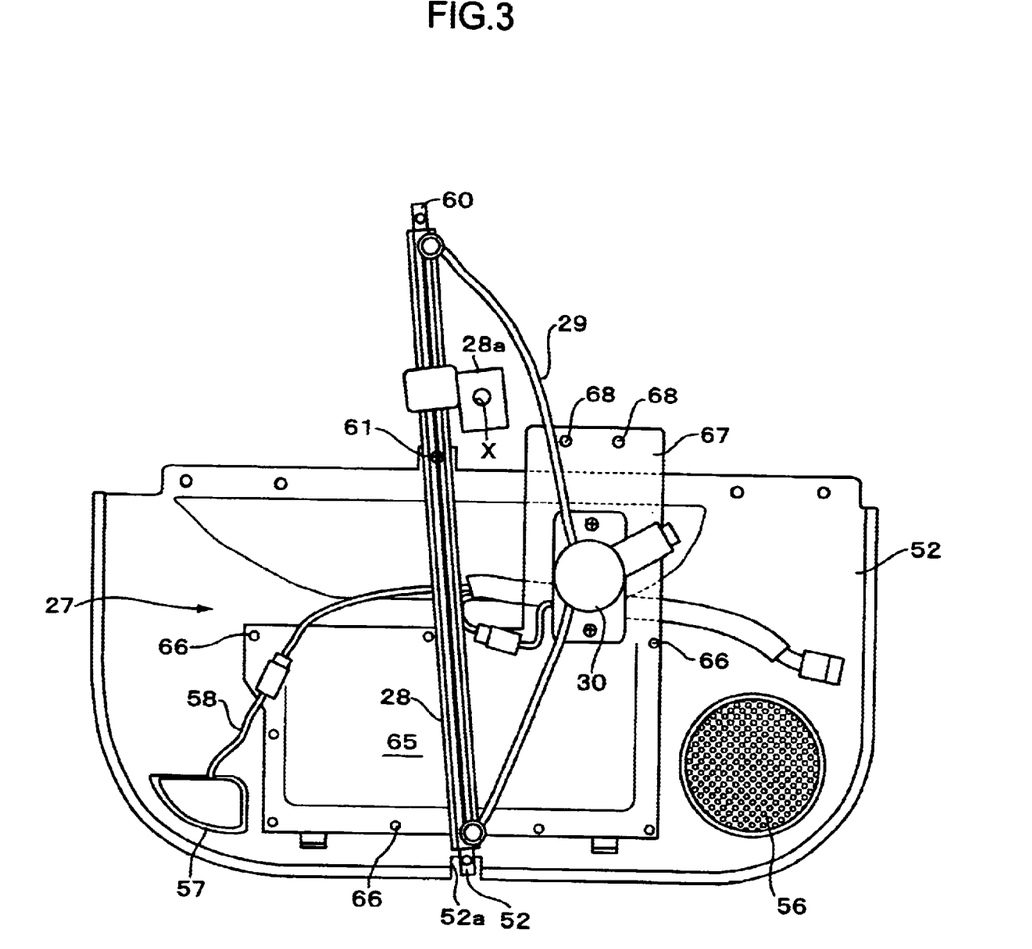
FIG. 3 is a back view of a lower trim shown in FIG. 1.

A glass elevating mechanism 27 for moving the door glass 26 up and down is, as shown in FIG. 3, configured so as to have a wire 29 to which a glass holder 28a sliding in a guide rail 28 is installed and a motor 30 for driving the wire 29.

Although two guide rails are installed in some cases, the guide rail 28 in this embodiment is configured by one rail, and is installed to a door trim 50 with a screw 61 or the like by subassembling.

Figure 5:
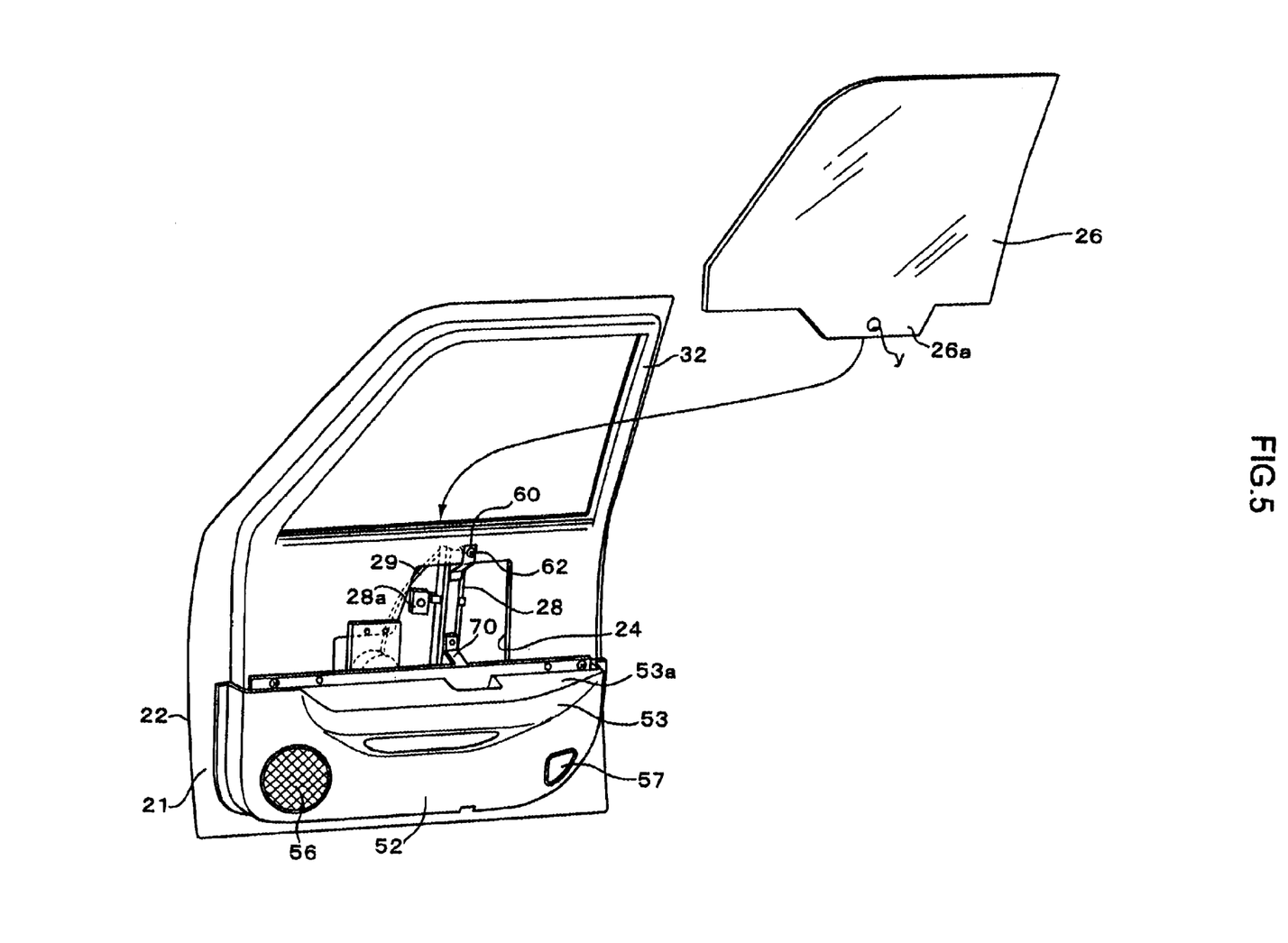
FIG. 5 is a perspective view showing a process for installing a door glass after a lower trim has been mounted to an inner panel.

One end of the wire 29 is attached to the motor 30 to be driven by the motor 30, and the other end thereof is connected to the glass holder 28a sliding in the guide rail 28. As shown in FIG. 5, a hole x in the glass holder 28a and a hole y in a lower end mounting portion 26a of the door glass 26 are caused to coincide with each other, and the door glass 26 is mounted to the guide rail 28 by using a fastener such as a screw, by which the door glass 26 can be moved up and down in the sash 32.

Figure 6:
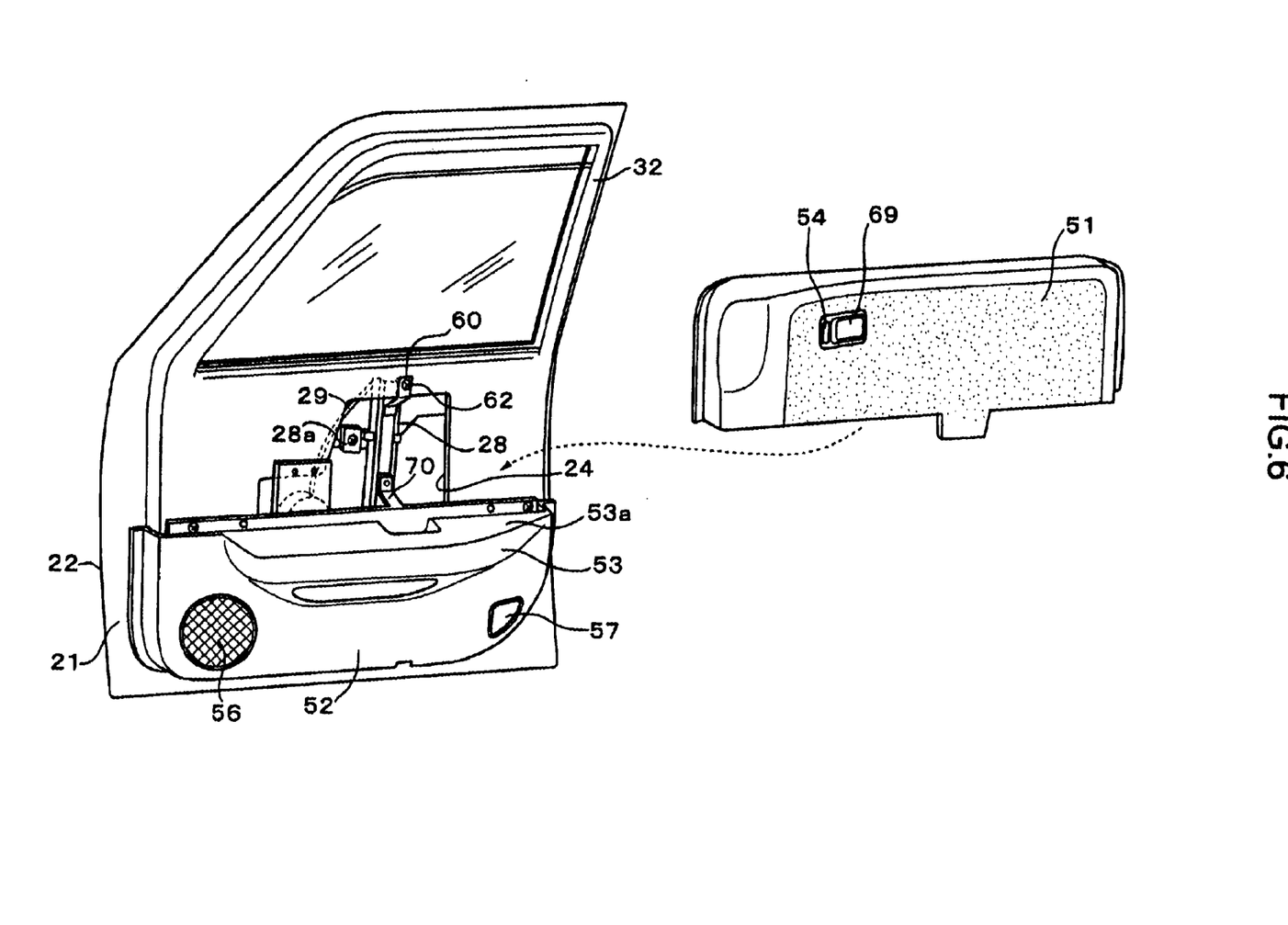
FIG. 6 is a perspective view showing a process for mounting an upper trim to an inner panel after a lower trim and a door glass have been installed.

As clearly shown in FIG. 6, the door trim 50 is divided into two trims of an upper trim 51 and a lower trim 52 in the vicinity of a shelf portion 53a of an armrest 53.

The lower trim 52 is formed with the armrest 53 at the upper part thereof, and is formed with a pocket 47 at the lower part thereof. On the back side of the pocket 47 is disposed a pocket back cover 65 to constitute a storage compartment for storing a map and the like.

The pocket back cover 65 is attached to the lower trim 52 with screws 66 or the like, and the upper end portion of the pocket back cover 65 is attached to the inner panel 21 with screws or the like inserted in attachment holes 68.

Figure 2:
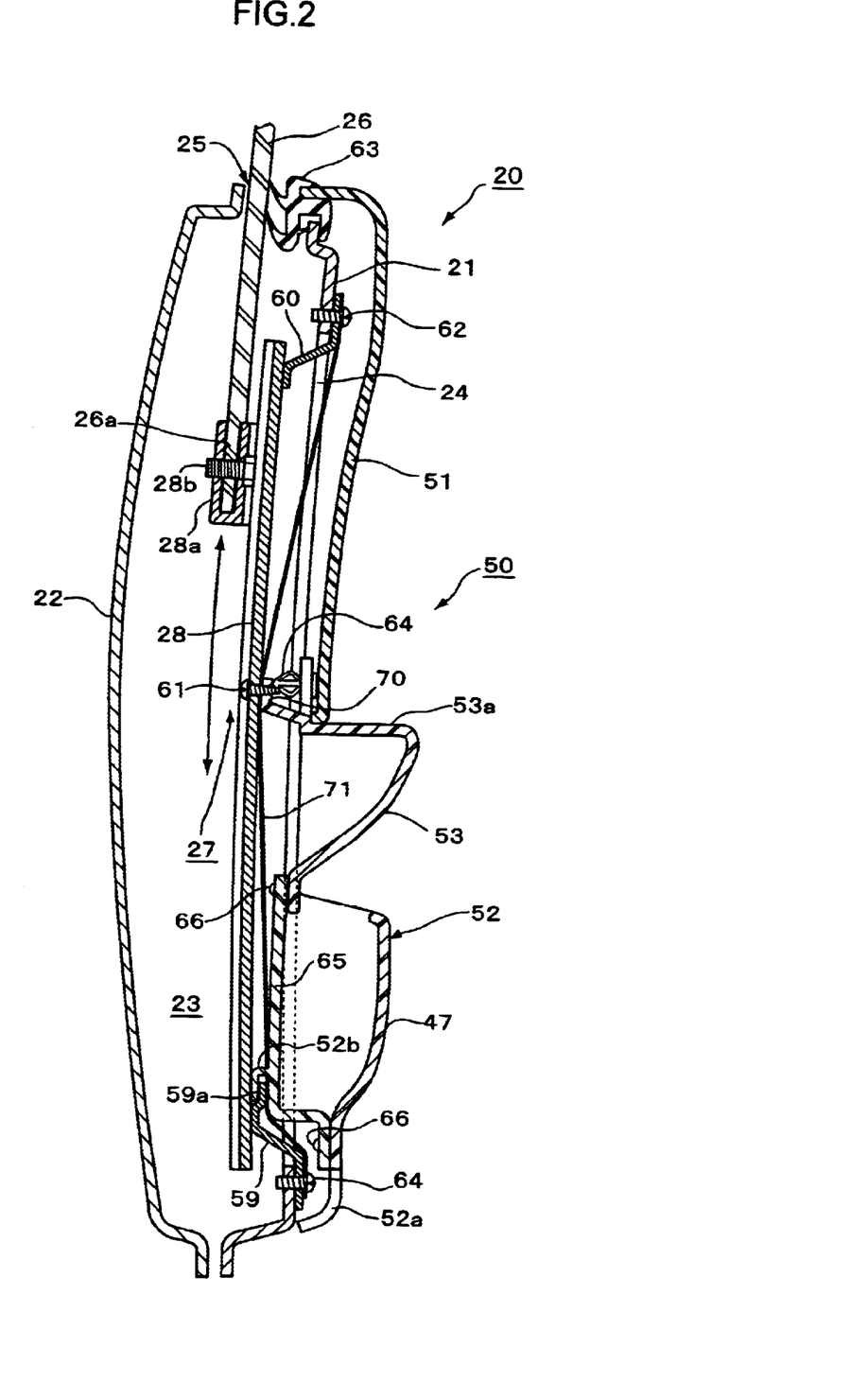
FIG. 2 is a sectional view taken along the line A—A of FIG. 1.

As clearly shown in FIG. 2, the upper part of the lower trim 52 is fixed to the guide rail 28 via a bracket 70 with the screw 61. The screw 61 extends transversely, and by using a shoulder bolt or the like, the relative longitudinal and vertical positions of the lower trim 52 and the guide rail 28 can be adjusted finely.

As shown in FIG. 3, the guide rail 28 is fitted with the glass holder 28a and the wire 29. The upper end portion of the guide rail 28 projects from the upper end of the lower trim 52, and the lower end portion thereof projects from the lower end of the lower trim 52 or from a notch opening 52a provided at the lower end of the lower trim 52.

The motor 30 to which the wire 29 is connected is mounted on an extended attachment element 67 formed extendedly on the upside of the pocket back cover 65. Also, the lower trim 52 is mounted with a step lamp 57 together with a speaker grille 56 and a harness 58.

Also, as shown in FIG. 6, the upper trim 51 is fitted with a door handle 69 configured by assembling an inside handle 54.

The lower trim 52 configured as described above is mounted to the inner panel 21 before the upper trim 51 is mounted to the inner panel 21.

Figure 4:
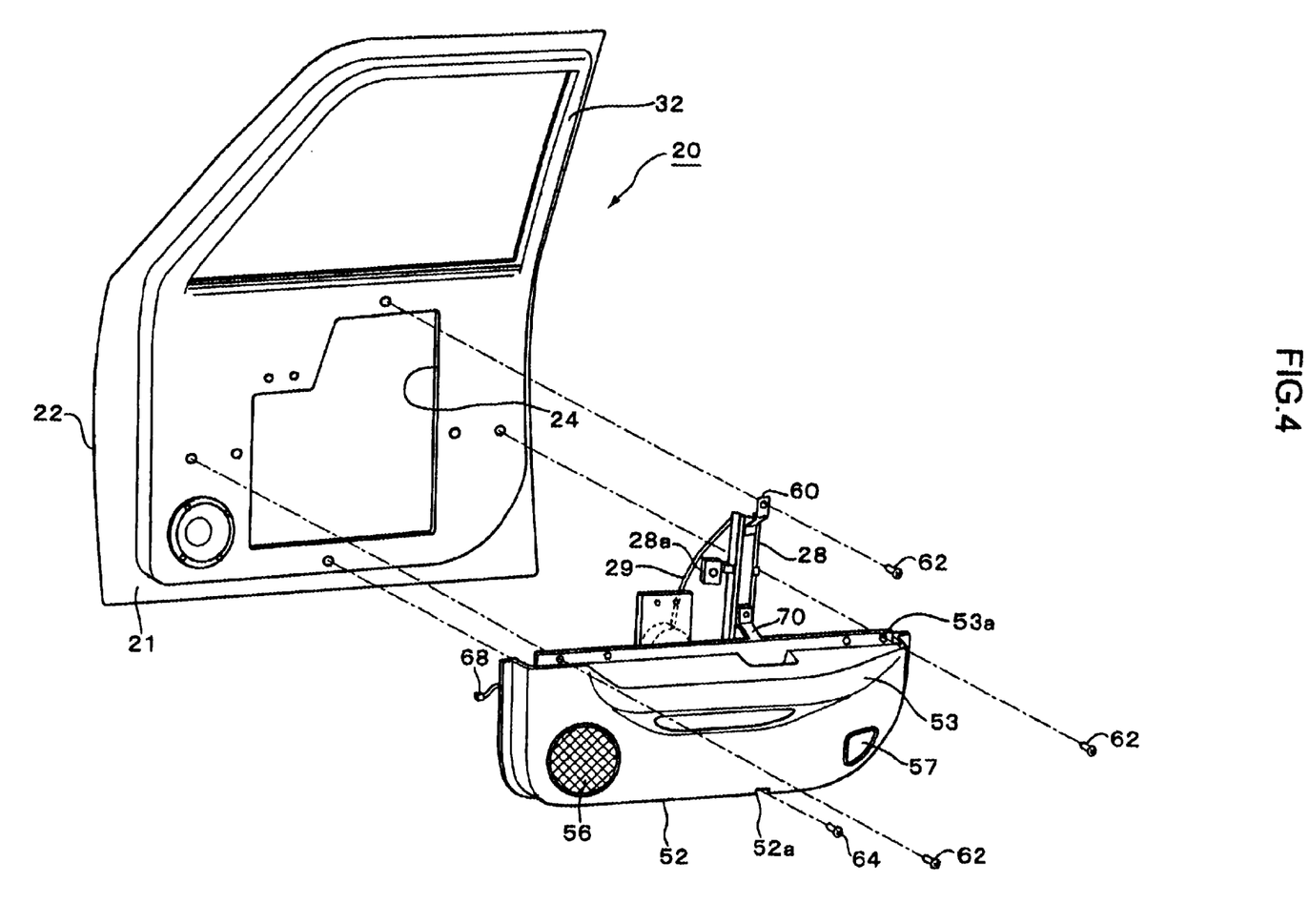
FIG. 4 is an exploded perspective view showing a process for mounting a lower trim to an inner panel.

Specifically, in order to mount the lower trim 52 to the inner panel 51, the upper and lower ends or the lower end of the guide rail 28 is slipped into the opening 24 from the state shown in FIG. 4 to arrange the glass elevating mechanism 27 between the inner panel 21 and the outer panel 22. After the lower trim 52 is placed along the inner panel 21 and a forked hook 52b formed in the lower end portion of the pocket back cover 65 is hooked on to an engagement protrusion 59a formed on a bracket 59, a bracket 60 attached to the upper end of the guide rail 28 is attached to the inner panel 21 with a screw 62 or the like, by which the lower trim 52 is mounted to the inner panel 21 (see FIG. 5).

In this state, the opening 24 is open to the upside because the upper trim 51 is not yet mounted to the inner panel 21.

Therefore, the lower end portion of the door glass 26 inserted through the upper opening 25 of the door space 23 can be exposed through the opening 24, so that the lower end mounting portion 26a of the door glass 26 can be inserted in the glass holder 28a. Thereby, the holes x and y are caused to coincide with each other, and the door glass 26 is fixed to the guide rail 28 via the glass holder 28a with a screw 28b or the like (see FIGS. 2 and 6).

Figure 1:
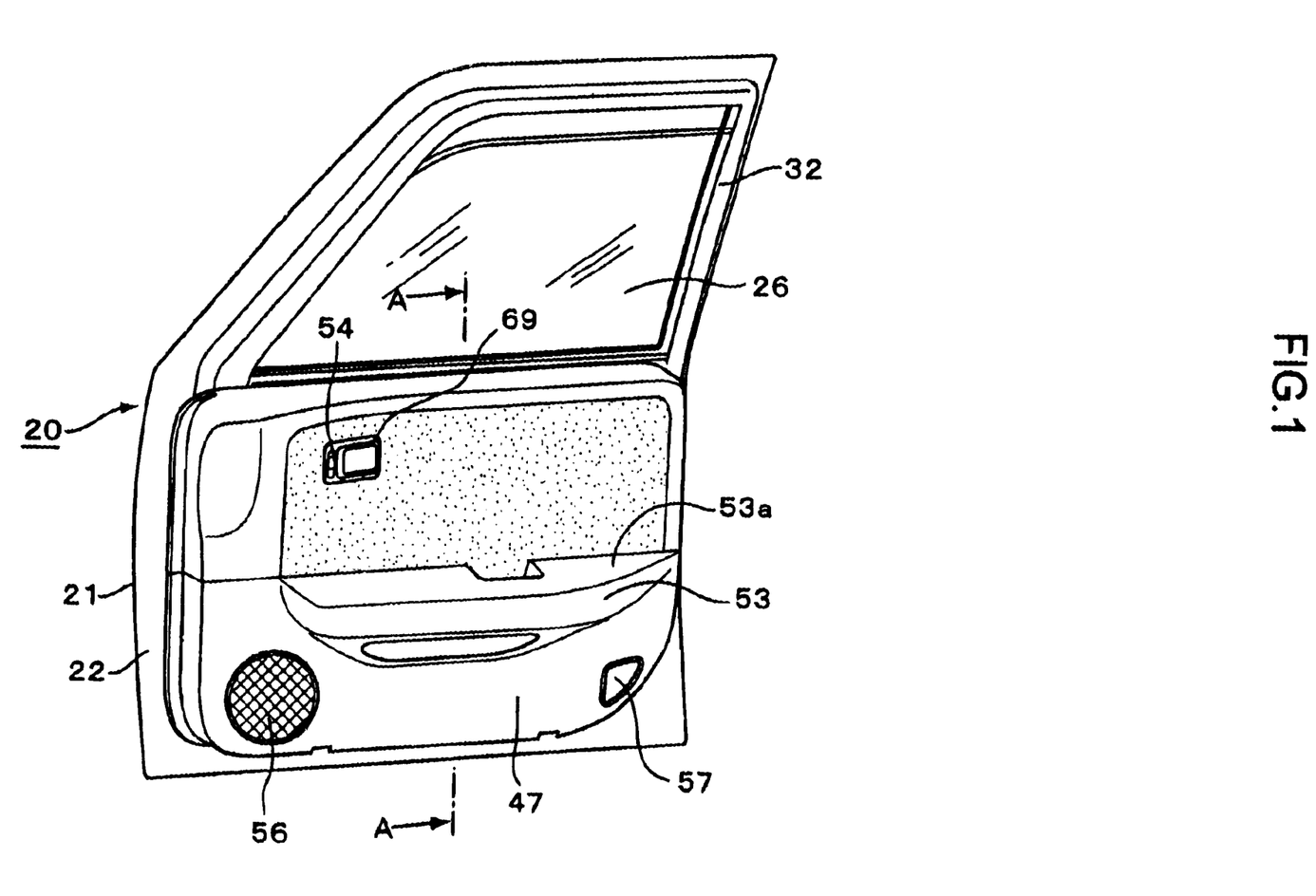
FIG. 1 is a perspective view of an automotive door construction to which an embodiment of the present invention is applied.

Subsequently, the upper trim 51 is mounted. Specifically, as shown in FIG. 2, the upper end of the upper panel 51 is engaged with a door inside seal 63 fitted at the upper end of the inner panel 21, and the lower end thereof is attached by using a clip 64 or the like, whereby the door body 20 shown in FIG. 1 is completed.

In the embodiment of the present invention configured as described above, the guide rail 28 is disposed across the opening 24 in the inner panel 21, so that the guide rail 28 also increases the rigidity of the inner panel 21. Thereby, the opening 24 can secure a very large opening area.

For this reason, in the installation work, the glass elevating mechanism 27 can be inserted through this large opening 24, so that the workability of doing the installation work is improved greatly.

Also, the door trim 50 is made up of two divided trims of the upper trim 51 and the lower trim 52, and after the lower trim 52 to which the door elevating mechanism 27 is subassembled is mounted to the inner panel 21, the door glass 26 is installed to the glass elevating mechanism 27 and then the upper trim 51 is mounted to the inner panel 21. Therefore, the installation work of the door glass 26 to the door elevating mechanism 27 can be done by using the opening 24, which is open large, because the installation work is done before the upper trim 51 is mounted, so that the installation work of the door glass 26 is easy to do, and moreover a larger-sized door glass 26 can also be installed.

Also, the subassembly of the glass elevating mechanism 27 to the lower trim 52 is made by subassembling the guide rail 28 to the pocket back cover 65 constituting the pocket 47 of the lower trim 52. Therefore, the pocket back cover 65 is configured so as to expand considerably into the door space 23 to form the pocket 47. For this reason, the guide rail 28 can be attached directly, and the lower trim 52 need not be formed with a boss or the like for attaching the guide rail 28. Also, the boss for attaching the guide rail 28 requires a considerable rigidity, so that a sink problem arises in molding the lower trim 52. In this embodiment, such a problem is solved by attaching the guide rail 28 to the pocket back cover 65.

Also, in the above-described embodiment, the extended attachment element 67 is formed integrally at the upper part of the pocket back cover 65, and the motor 30 constituting the glass elevating mechanism 27 is mounted on the extended attachment element 67. Therefore, a load applied to the motor 30 to activate the glass elevating mechanism 27 is distributed in the plane direction of the extended attachment element 67, so that the vibrations of the motor 30 are not transmitted to the door trim 50 itself.

Also, in this embodiment, since the motor 30 is not mounted directly on the door trim 50, a mounting boss or the like for mounting the motor 30 need not be erected on the door trim 50, so that a sink problem occurring in molding the door trim 50 can be solved.

Also, in the above-described embodiment, since the extended attachment element 67 is attached to the inner panel 21 by using screws or the like, the rigidity of the door trim 50, especially the lower trim 52, can be increased, so that the behavior of the motor 30 at the time when the door is closed can be retrained completely.

Also, in the above-described embodiment, since the upper part of the lower trim 52 is fixed to the guide rail 28, restrictions on the installation of the door trim 50 itself to the inner panel 21, which are imposed by the increase in area of the opening 24 in the inner panel 21, are eliminated. Specifically, since the upper part of the lower trim 52 is fixed to the guide rail 28 whose upper and lower ends are attached to the inner panel 21, the lower trim 52 is resultantly attached to the inner panel 21, so that restrictions on the installation of the door trim 50 itself to the inner panel 21 are eliminated.

Also, just at the upper part of the lower trim 52 exists the armrest 53, and the armrest 53 is usually fitted with a pull handle (not shown). When the pull handle is operated, a load applied to the lower trim 52 is transmitted to and supported by the guide rail 28, so that the displacement of the door trim 50 can be decreased greatly.

Also, in the above-described embodiment, since a shoulder bolt or the like extending in the transverse direction of a vehicle body is used as the screw 61 fixing the guide rail 28 to the upper part of the lower trim 52, the guide rail 28 and the lower trim 52 are fixed to each other so as to be finely adjustable in the longitudinal and vertical directions of the vehicle body. Thereby, the guide rail 28 is installed with the inner panel 21 being the reference. In this case, variations in installation of the guide rail 28 to the lower trim 52 can be absorbed by finely adjusting the guide rail 28 and the lower trim 52 in the longitudinal and vertical directions of the vehicle body.

As described above, in the present invention, the guide rail is disposed across the opening in the inner panel, so that the guide rail also increases the rigidity of the inner panel. Therefore, the opening can secure a very large opening area.

For this reason, the installation work is done by inserting the glass elevating mechanism through this large opening, so that the installation workability can be improved greatly.

Also, according to the present invention, the door trim is made up of two divided trims of the upper trim and the lower trim, and after the lower trim to which at least the door elevating mechanism is subassembled is mounted to the inner panel, the door glass is installed to the glass elevating mechanism and then the upper trim is mounted to the inner panel. Therefore, the installation work of the door glass to the door elevating mechanism can be done by using the opening, which is open large, because the installation work is done before the upper trim is mounted, so that the installation work of the door glass is easy to do.

Also, since the trim, elevating unit, harness, and the like are subassembled, the clearances can be minimized. As the result, the volume of a door pocket and a joint portion can be increased greatly, so that the degree of freedom of design is increased, and the ease of use of the pocket and the armrest is significantly made greater.

What is claimed is:

1. An automotive door construction for a vehicle configured so that a door space is formed by joining outer edges of an outer panel and an inner panel, and the inner panel side of said door space is covered with a door trim, wherein
said door trim is made up of two divided trims of an upper trim and a lower trim, said lower trim being an innermost trim with respect to the vehicle;
at least a glass elevating mechanism is installed on the side of said lower trim so as to facilitate positioning of said glass elevating mechanism on said inner panel by positioning said lower trim piece on said inner panel;
the upper and lower end portions of a guide rail constituting said glass elevating mechanism project from the upper and lower end side of said lower trim;
said guide rail and said lower trim are mounted to said inner panel such that said guide rail is connected to said inner panel in a state of being disposed in said door space so as to lie across an opening, which is formed in the central portion of said inner panel and is open to said door space; and
said upper trim is mounted to an upper portion of said inner panel,
wherein said opening includes an upper portion and a lower portion with respect to a floor of the vehicle, said upper trim covering said upper portion of said opening and said lower trim covering said lower portion of said opening.

2. The automotive door construction according to claim 1, wherein a subassembly of said glass elevating mechanism is at least a subassembly in which said guide rail is assembled to a pocket back cover constituting a pocket of said lower trim.

3. The automotive door construction according to claim 2, wherein an extended attachment element is formed integrally at an upper part of said pocket back cover, and a motor constituting said glass elevating mechanism is mounted on said extended attachment element.

4. The automotive door construction according to claim 3, wherein said extended attachment element is attached to said inner panel.

5. The automotive door construction according to claim 1, wherein said guide rail is fixed to an upper part of said lower trim.

6. The automotive door construction according to claim 1, wherein said guide rail and said lower trim are fixed to each other so as to be finely adjustable in the longitudinal and vertical directions of a vehicle body.

7. An automotive door construction according to claim 1, wherein a door glass to be elevated by said glass elevating mechanism is mounted to said guide rail through said opening of said inner panel on which said lower trim is mounted.

8. The automotive door construction according to claim 1, wherein said glass elevating mechanism is installed on the side of said lower trim in advance by subassembling.

9. An automotive door for a vehicle including an internal door space and an inner panel, said inner panel including an opening to said internal door space, comprising:
an upper trim mounted on said inner panel;
a lower trim mounted on said inner panel, said lower trim being an innermost trim with respect to the vehicle;
a glass elevating mechanism mounted on said lower trim so as to facilitate positioning of said glass elevating mechanism on said inner panel by positioning said lower trim piece on said inner panel; and
a guide rail mounted to said inner panel so as to lie across said opening and reinforce said inner panel,
wherein said opening includes an upper portion and a lower portion with respect to a floor of the vehicle, said upper trim covering said upper portion of said opening and said lower trim covering said lower portion of said opening.

10. The automotive door of claim 9, wherein said lower trim comprises a pocket back cover, said glass elevating mechanism being pre-mounted to said pocket back cover.

11. The automotive door of claim 10, wherein said lower trim further comprises an extended attachment element integrally formed at an upper part of said pocket back cover, and wherein said glass elevating mechanism comprises a motor mounted on said extended attachment element.

12. The automotive door of claim 11, wherein said extended attachment element is attached to said inner panel.

13. The automotive door of claim 9, wherein said guide rail is mounted to an upper part of said lower trim.

14. The automotive door of claim 9, wherein said guide rail is adjustably mounted to said inner panel so as to be finely adjustable in at least one of a substantially longitudinal and a substantially vertical direction of a vehicle body.

15. The automotive door of claim 9, wherein said glass elevating mechanism is pre-mounted on said lower trim by subassembling.

* * * * *